(12) United States Patent
Linnartz

(10) Patent No.: US 7,761,077 B2
(45) Date of Patent: Jul. 20, 2010

(54) DIVERSITY RECEIVER

(75) Inventor: Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 69 days.

(21) Appl. No.: 10/569,179

(22) PCT Filed: Aug. 24, 2004

(86) PCT No.: PCT/IB2004/051554

§ 371 (c)(1),
(2), (4) Date: Feb. 22, 2006

(87) PCT Pub. No.: WO2005/022778

PCT Pub. Date: Mar. 10, 2005

(65) Prior Publication Data

US 2007/0004364 A1 Jan. 4, 2007

(30) Foreign Application Priority Data

Sep. 3, 2003 (EP) .................................. 03103281

(51) Int. Cl.
*H04B 1/10* (2006.01)
(52) U.S. Cl. ..................... 455/297; 455/272; 455/278.1
(58) Field of Classification Search .................. 455/272, 455/273, 275, 276.1, 278.1, 283, 284, 295, 455/296, 297, 303; 375/267, 347
See application file for complete search history.

(56) References Cited

U.S. PATENT DOCUMENTS

| | | | |
|---|---|---|---|
| 3,737,783 A | | 6/1973 | Oswald et al. |
| 4,097,866 A | * | 6/1978 | Frost et al. .................. 342/380 |
| 4,190,837 A | * | 2/1980 | Salvaudon et al. ............ 342/17 |
| 4,888,593 A | * | 12/1989 | Friedman et al. ............ 342/387 |
| 4,969,211 A | * | 11/1990 | Raymond ................ 455/277.1 |
| 5,125,108 A | * | 6/1992 | Talwar .................... 455/278.1 |
| 5,152,010 A | * | 9/1992 | Talwar ....................... 455/136 |

(Continued)

FOREIGN PATENT DOCUMENTS

DE 4040599 A1 7/1992

(Continued)

OTHER PUBLICATIONS

Minoru Okada, et al: Array Antenna Assisted Adaptive Modulation in a Fast Fading Channel, VTC May 2001, IEEE vol. 2 of 4, CONF 53, pp. 1249-1253, XP001067162.

(Continued)

*Primary Examiner*—Edward Urban
*Assistant Examiner*—Christian A Hannon

(57) ABSTRACT

A diversity receiver receives high rate radio signals (for example DVB-T signals) while the receiver is moving at a high speed (for example in or with a car). Two or more antennas are closely spaced and arranged behind each other in the direction of motion for receiving the radio signals. A difference $(S_2(t)-S_1(t))$ of a first signal $(S_1(t))$ obtained via the first antenna and a second signal $(S_2(t)$ obtained via the second antenna serves as an estimation of the spatial derivative of the receiving channel transfer function. This spatial derivative is interpreted as a temporal derivative and exploited to cancel or at least reduce distortions (for example ICI) due to rapid receiving channel variations.

17 Claims, 4 Drawing Sheets

U.S. PATENT DOCUMENTS

| | | | | |
|---|---|---|---|---|
| 5,260,711 | A | * 11/1993 | Sterzer | 342/375 |
| 5,592,471 | A | 1/1997 | Briskman | |
| 5,844,632 | A | 12/1998 | Kishigami et al. | |
| 6,275,180 | B1 | * 8/2001 | Dean et al. | 342/70 |
| 6,559,724 | B2 | * 5/2003 | Rosenberg et al. | 330/308 |
| 7,130,355 | B1 | * 10/2006 | Al-Dhahir et al. | 375/267 |
| 2003/0053412 | A1 | * 3/2003 | Yoshida et al. | 370/208 |

FOREIGN PATENT DOCUMENTS

| | | |
|---|---|---|
| DE | 4140741 A1 | 6/1993 |
| EP | 0718986 A2 | 6/1996 |
| EP | 0767554 A2 | 4/1997 |
| EP | 0851605 A2 | 7/1998 |
| JP | 4-185130 | 7/1992 |
| JP | 4185130 A | 7/1992 |

OTHER PUBLICATIONS

Written Opinion of the International Searching Authority PCT/IB2004/051554.

* cited by examiner

DIVERSITY RECEIVER

The present invention in general relates to a diversity receiver having multiple receiving branches, and more particularly to a diversity receiver being suitable for receiving high rate radio signals while the receiver is moving at a high speed. Furthermore, the present invention relates to a method for canceling or at least reducing signal distortions of a radio signal received by a moving diversity receiver, to a computer program stored on a record carrier or made available for download, said computer program being adapted to carry out a method for canceling or at least reducing signal distortions of a radio signal received by a moving diversity receiver, and to an antenna system.

In mobile reception, radio signals experience channel conditions that vary (often rapidly) with time. This is mainly caused by multipath radio signal propagation, wherein reflected waves may cancel each other at one location, but may enhance each other elsewhere. A well known model to describe this effect, which is referred to as "fading", is to assume that the received signal consists of multiple reflected waves, each arriving from a different angle at the moving receive antenna. This results in slightly different Doppler shifts for each wave. The collection of Doppler shifts is called Doppler spread of a signal.

In general, the fading effects for a moving receiver are seen as time variations of the radio channel.

Diversity is a known method to improve the reliability of reception of radio signals. In a diversity system at least two antennas are used to receive the radio signal. Signals from the at least two antennas are combined to improve the reliability of reception. If the channel is fading, an adaptation method is used to continuously ensure that the signals from the multiple antennas are combined in a constructive way.

JP-A-04-185130 discloses a diversity receiver of the above mentioned type. To reduce the effect of a multipath and to attain stable transmission reception, there is provided a second antenna parted spatially with respect to a first antenna. The distance between the two antennas is spatially parted by $\lambda/3$ (wherein $\lambda$ is a wavelength of a carrier) or over that, so that a reception signal from the one antenna and a reception signal from the other antenna are almost in non-correlation.

A further approach for improving the reliability of reception is to process the received signal in order to mitigate the effects of channel variations. In particular for Orthogonal Frequency Division Multiplexing (OFDM) modulation methods, it is known that rapid channel variations lead to a degradation of the reliability of the radio link. OFDM is a modulation method in which multiple user symbols are transmitted in parallel using different sub-carriers. The OFDM receiver structure allows relatively straightforward signal processing.

A practical implementation of the OFDM modulation method typically involves a (Fast) Fourier Transformation of the user bits, before and after radio transmission. As a result, the data are divided into many parallel streams. Each stream is modulated on a different sub-carrier frequency. In general, OFDM systems are designed such that each data symbol waveform is located around a particular sub-carrier frequency, and that its bandwidth is small enough to experience frequency-flat fading, when the signal is received over a (moderately) frequency-selective channel. The modulated sub-carriers comprise overlapping side lobes. In many existing systems the rectangular pulse shape leads to a spectrum according to a sinc function. These signal waveforms are carefully spaced in frequency and thereby designed to be orthogonal, i.e. not interfering with each other. A Doppler spread, for example caused by fading, is detrimental to this orthogonality of the OFDM sub-carrier signals since arriving waves will interfere with other waves having different frequency offsets. This is called inter-carrier interference (ICI).

Although with diversity receivers, for example of the type disclosed in JP-A-04-185130, the reliability of reception may be improved compared to systems comprising only one antenna, there is still a problem in that channel conditions that vary rapidly with time cause distortions, for example due to ICI, especially in the context of reception of high rate radio signals and receivers moving at high speed.

It is therefore an object of the present invention to provide a diversity receiver, a method, and a computer program capable to cancel or at least reduce signal distortions due to (rapid) channel variations. Furthermore, it is an object of the present invention to provide an antenna system suitable to be used with the diversity receiver and the method in accordance with the invention.

In accordance with a first aspect of the present invention, the first of the above objects is solved by a diversity receiver comprising a first receiving branch having associated thereto a first antenna element and at least a second receiving branch having associated thereto a second antenna element, the diversity receiver comprising first means for obtaining from a first signal on the first receiving branch and a second signal on the second receiving branch a third signal representing an estimation of the spatial derivative of at least one receiving channel parameter, wherein the third signal is used to cancel or at least reduce signal distortions that occur due to time-variations of the receiving channel.

In accordance with a second aspect of the present invention, the first of the above objects is solved by a method for canceling or at least reducing signal distortions of a radio signal received by a moving diversity receiver, especially a moving diversity receiver in accordance with the present invention, wherein the signal distortions occur due to time-variations of a receiving channel in a radio system, said method comprising the following steps: receiving the radio signal at two closely spaced positions differing in the direction of motion; estimating the spatial derivative of at least one receiving channel parameter on the basis of the radio signal received at the two positions; interpreting the spatial derivative of the at least one receiving channel parameter as the temporal derivative of the at least one receiving channel parameter; and exploiting the temporal derivative of the at least one receiving channel parameter to cancel or at least reduce the signal distortions.

In accordance with a third aspect of the present invention, the first of the above objects is solved by a computer program stored on a record carrier or made available for download, said computer program being adapted to carry out the following method for canceling or at least reducing signal distortions of a radio signal received by a moving diversity receiver: estimating, on the basis of a radio signal received at two closely spaced positions differing in the direction of motion, the spatial derivative of at least one receiving channel parameter; interpreting the spatial derivative of the at least one receiving channel parameter as the temporal derivative of the at least one receiving channel parameter; and exploiting the temporal derivative of the at least one receiving channel parameter to cancel or at least reduce the signal distortions.

In accordance with a fourth aspect of the present invention, the second of the above objects is solved by an antenna system for receiving a radio signal at at least two closely spaced positions differing in the direction of motion, wherein the antenna system comprises at least a first antenna element and a second antenna element arranged such that the mutual interaction of the radiation patterns is small. In this connection it is preferred that the first and the second antenna are vertical whips that are arranged in parallel, preferably extending from a common basis in opposite directions.

The above mentioned aspects of the present invention are based on the finding that by estimating and exploiting the spatial derivative of the at least one receiving channel parameter, especially the receiving channel transfer function, besides advantages for a simplified tracking and estimation, an effective cancellation or at least a reduction of distortions may be achieved. This is particularly due to the fact that for a moving receiver the spatial derivative contains information concerning the temporal derivative. For example, in connection with ICI countermeasures there exist solutions based on the separation of wanted und unwanted signal components. This can involve the separation of individual frequency-shifted components, or the separation of (orthogonal) sub-carrier amplitudes and (interfering and/or crosstalking) derivatives of amplitudes. A significant portion of techniques used for cancellation or least reduction of ICI is based on the concept that the amplitudes of the sub-carrier describe receiving channel parameters, especially the transfer function of the wanted signal, whereas the temporal derivatives (i.e., changes) of these amplitudes cause ICI.

Although most of the following features are only claimed in connection with the diversity receiver, it is to be noted that the person skilled in the art may suitably adapt these features without problem such that they may also be used advantageously in connection with the method and/or the computer program in accordance with the present invention.

The first antenna element and the second antenna element are preferably closely spaced and arranged behind each other in the direction of motion of the diversity receiver. The direction of motion particularly may be the direction of motion of a vehicle comprising the receiver. The first antenna element is preferably considered to be the main antenna receiving the main signal component, wherein the second antenna element follows at least substantially the same spatial path as the first one, but with a slight time lag.

Furthermore, the first means preferably obtain the third signal as a difference between the first signal and the second signal. This is due to the fact that the spatial derivative of the receiving channel parameter, especially of the channel transfer function, may be estimated as the difference between to (closely) spaced antennas. For many embodiments it is preferred that the difference signal closely approximates the spatial derivative modulated by the user data of the signal. In this context it is further preferred that this modulated derivative is used directly to mitigate ICI in the main signal. However, the basic idea to exploit the spatial derivatives can also be applied in more sophisticated receiver architectures, whereby the clean derivatives, i.e., without modulation, are estimated from said difference signal and are used to enhance the performance of the channel estimation, synchronization and/or ICI mitigation algorithms.

It is also preferred that the third signal (preferably without further processing) is interpreted as the temporal derivative of the at least one receiving channel parameter, at least when the diversity receiver is moved.

With preferred embodiments the diversity receiver according to the invention further comprises: second means for processing the third signal to obtain a fourth signal; third means for processing the first signal to obtain a fifth signal; and fourth means for combining the fourth signal and the fifth signal. The combining of the fourth signal and the fifth signal may, without being limited thereto, be achieved by an adder.

In this context it is further preferred that one or more of the first means, the second means, the third means, and the fourth means are fully or in part realized by hardware interacting with software and/or by discrete components. Without being limited thereto, it is preferred that the first, second, third, and fourth means are realized at least in part by a software-controlled microprocessor executing instructions in a computer program stored on a computer-readable medium.

It is also preferred that the second means perform one or more of the following functions: filtering, sampling, A/D-conversion, serial-to-parallel conversion, multiplying with a ramp function, (Fast) Fourier Transforming, multiplying with a crosstalk matrix, and signal weighting.

In this context it is particularly advantageous, if the second means perform a signal weighting function comprising a multiplication with a weighting factor controlled to minimize the signal distortions. For example, an adaptive control loop can be used to set the weighting factor to ensure that the correlation between the resulting output signal and the respective derivative is zero.

Depending on the respective embodiment, the third means preferably perform one or more of the following functions: filtering, sampling, A/D-conversion, serial-to-parallel conversion, and (Fast) Fourier Transforming.

Without being limited thereto, it is preferred for all embodiments of the invention that the at least one receiving channel parameter is a receiving channel transfer function. However, also different or related parameters such as attenuation, gain, phase shift, etc. may be considered.

In accordance with a further development of the present invention, for creating a virtual third antenna, there are provided switching means for switching from a signal on the first receiving branch to a corresponding signal on the second receiving branch. The switching preferably is done linearly and smoothly. By appropriately choosing the rate of the transitions, the position of the virtual antenna can be fixed in space, despite the motion of the first and second antennas.

The first antenna element and the second antenna element may be arranged in parallel but extend in different directions. With preferred embodiments the antennas extend from a common basis. In general, special constructions are possible to create an antenna system that receives signals at two closely spaced locations with small mutual interaction of the radiation pattern.

Without being limited thereto, the present invention may advantageously be used in one or more of the following systems: Orthogonal Frequency Division Multiplexing (OFDM) systems, Digital Audio Broadcasting (DAB) systems, Digital Video Broadband (DVB) systems, for example DVB-T systems, Digital Terrestrial Television Broadcasting (DTTB) systems, Code Division Multiple Access (CDMA) systems, for example cellular CDMA systems, Universal Mobile Telecommunications Systems (UMTS), the Global System for Mobile communications (GSM), Digital Enhanced Cordless Telecommunication (DECT) systems, wireless local area network systems, for example according to the standard 802.11a, 802.11g, or HIPERLAN II.

It is a gist of the present invention to recognize that the temporal derivatives causing distortions, especially ICI, for a moving receiver in fact are spatial derivatives. I.e., temporal changes of the signal occur predominantly because the antenna is moved in a spatially-changing, but temporally stationary environment. Therefore, it is possible to estimate the spatial derivative of the channel transfer function as the difference between the signals from two closely spaced antennas. For a moving antenna it is possible to estimate the temporal derivative as a spatial derivative, thus by subtracting two antenna signals. A condition is that the two antennas are spatially separated in the same direction as the direction of motion.

The above and further aspects and advantages of the invention will be apparent and elucidated with reference to the embodiments described hereinafter and shown in the drawings.

Figure 3:
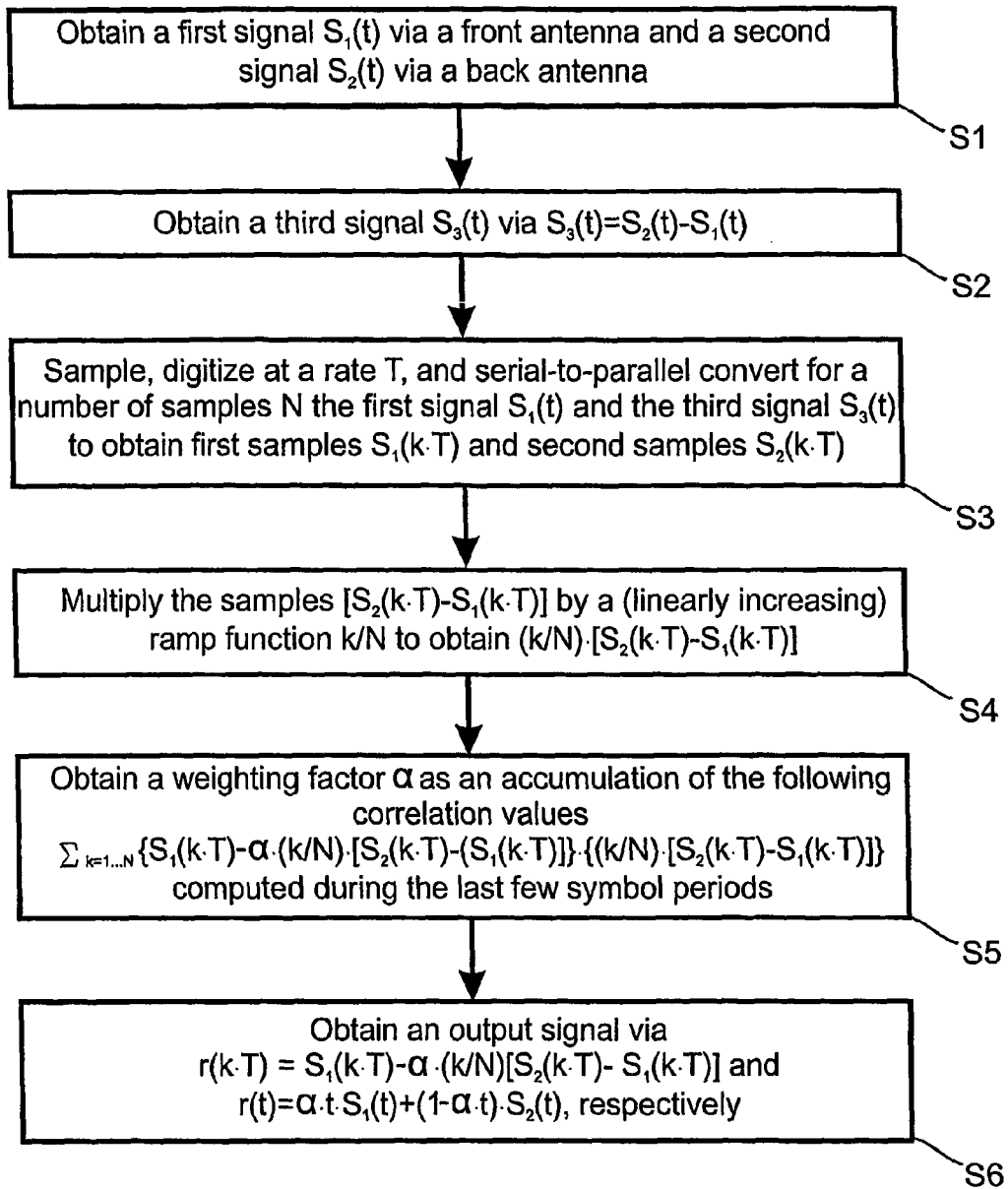
Figure 4:
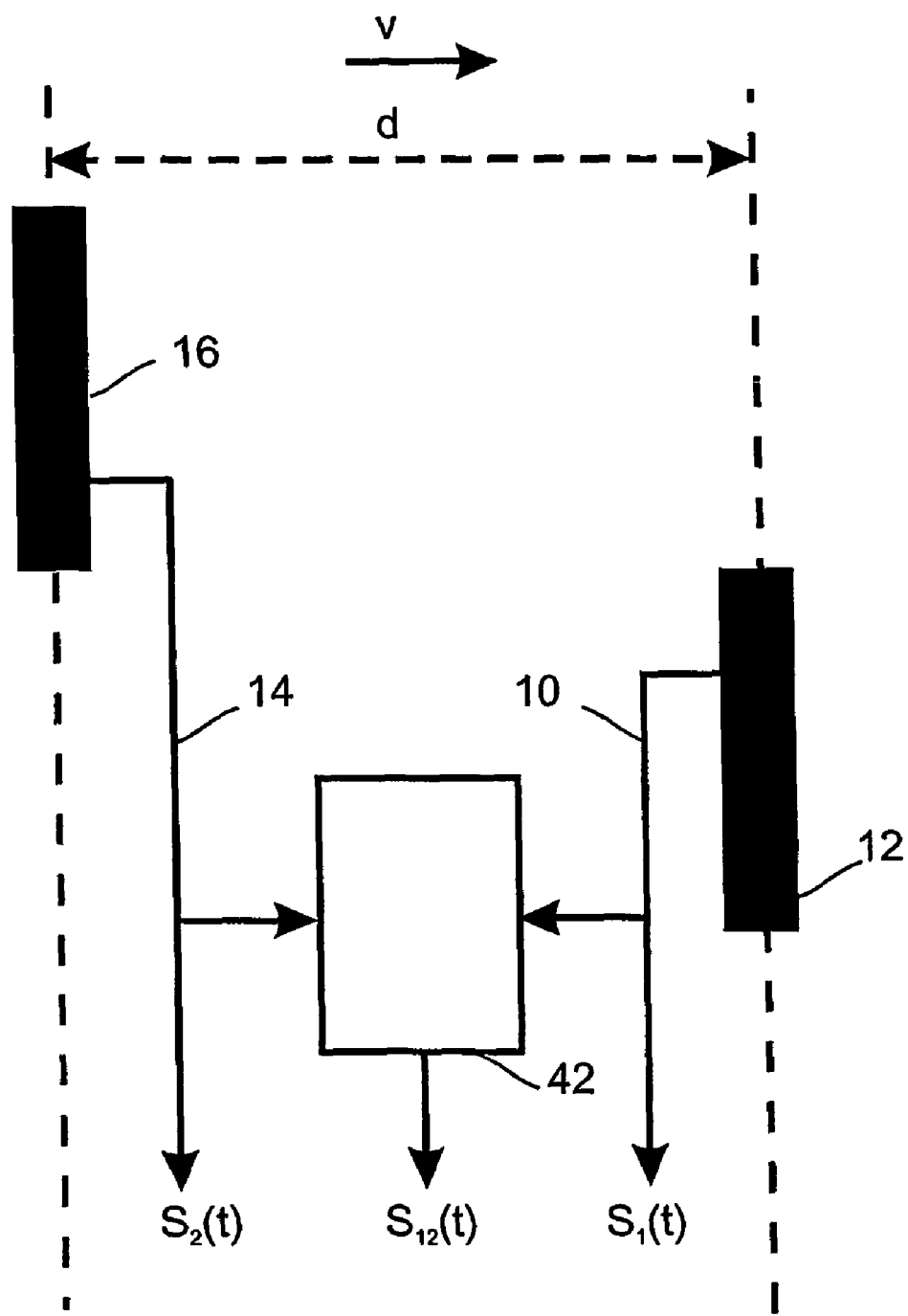

FIG. 3 shows a flowchart illustrating an embodiment of the method in accordance with the present invention, and also an embodiment of the method that may be carried out with the computer program in accordance with the present invention; and FIG. 4 shows a simplified schematic block diagram of an antenna arrangement in accordance with the present invention, as well as the use of switching means for creating a virtual antenna.

Figure 1:
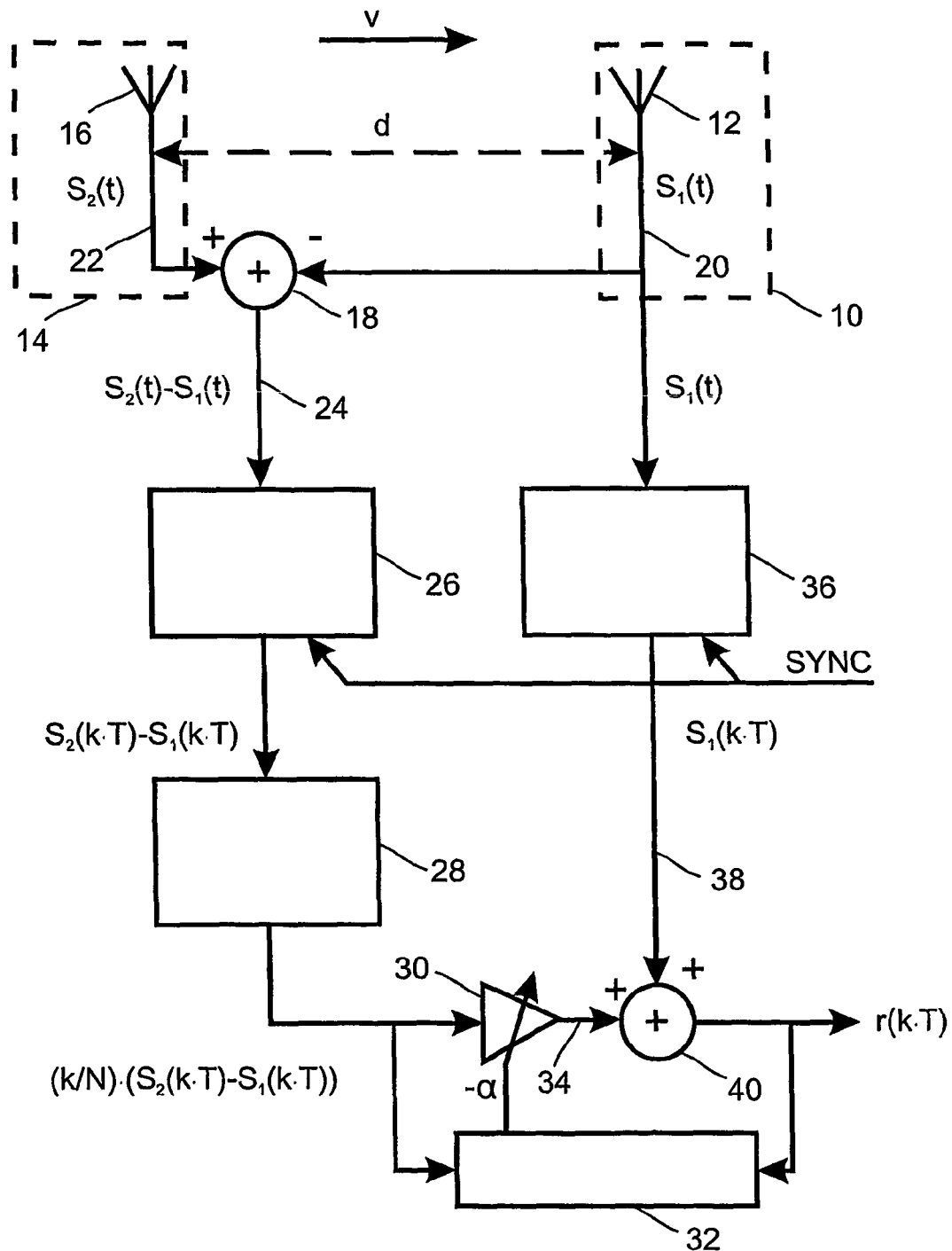
FIG. 1 shows a simplified schematic block diagram of a first embodiment of a diversity receiver in accordance with the present invention.

FIG. 1 shows a simplified schematic block diagram of a first embodiment of the diversity receiver in accordance with the present invention. The diversity receiver illustrated in FIG. 1 comprises a first receiving branch 10 and a second receiving branch 14. The first receiving branch 10 comprises a first (front) antenna 12 and the second receiving branch 14 comprises a second (back) antenna 16. The first antenna element 12 and the second antenna element 16 are closely spaced by a distance d and arranged behind each other in the direction of motion v of the diversity receiver. Preferably, the distance d will be smaller than $\lambda/2$ (or even smaller than $\lambda/3$), because for spacings beyond $\lambda/3$ the approximation by considering only first-order derivatives becomes less accurate and this might reduce the effectiveness of the invention. For example the first antenna element 12 and the second antenna element 16 may be mounted to a car and may be formed by an antenna system in accordance with the present invention, described later with reference to FIG. 4. Preferably the antenna signals are constrained in bandwidth by RF pre-filters that are not shown in the drawings. In accordance with FIG. 1 there are provided first means 18 for obtaining from a first signal 20 ($S_1(t)$) on the first receiving branch 10 and a second signal 22 ($S_2(t)$) on the second receiving branch 14 a third signal 24. In the embodiment shown in FIG. 1 the first means are formed by an adder/subtracter 18 which for obtaining the third signal 24 calculates the difference between the second signal 22 and the first signal 20, i.e. $S_2(t)-S_1(t)$. The third signal 24, i.e. the difference between the second signal 22 and the first signal 20, represents an estimation of the spatial derivative of the receiving channel transfer function. It is a basic idea of the present invention to interpret this spatial derivative of a receiving channel parameter, particularly the channel transfer function, as the temporal derivative of the respective receiving channel parameter, and to use the temporal derivative to cancel or at least reduce ICI or other distortions. In accordance with the embodiment shown in FIG. 1 there are provided second means 26, 28, 30, 32 for obtaining from the third signal 24 a fourth signal 34, and third means 36 for obtaining from the first signal 20 a fifth signal 38. In the present embodiment the second means 26, 28, 30, 32 as well as the third means 36 comprise a sampling and serial-to-parallel converting unit 26 and 36, respectively. The interconnects between blocks 26, 36, 28, 38, 30, 40 preferably carry digital real or complex vector signals. That is, multiple, preferably N, values are multiplexed, for example using a state of the art bus technology. These units 26 and 36 sample and digitize the third signal 24 and the first signal 20, respectively, at a rate T and perform a serial-to-parallel conversion for a number of samples N that corresponds to a typical amount of data that is used by the diversity receiver. For example, in connection with DVB-T the number of samples N will preferably correspond to an OFDM symbol or frame. In the embodiment illustrated in FIG. 1, a clock signal SYNC from the receiver is used to synchronize the serial-to-parallel conversions, for example to the OFDM signal timing structure of N·T periods, and preferably also to period T. Alternatively it is possible to obtain the necessary synchronization without the feedback SYNC from the main receiver. For example the synchronization may be obtained from a first free running oscillator, giving a pulse at instants N·T, with N=0, 1, . . . , and a second oscillator giving a pulse at instants $N_a$·T, with $N_a$=0.5, 1.5, 2.5, . . . . In this case the circuitry 36 connected to the first signal 20, i.e. $S_1(t)$, and the circuitry 26, 28, 40 (the elements 28 and 40 are described below) connected to third signal 24, i.e. $S_2(t)-S_1(t)$, are preferably duplicated to create a second output signal $r_a(k·T)$ (not shown in the drawings) which is sent to a second receiver (also not shown in the drawings). Thus, the main receiver seeing $r(k·T)$, and the second receiver seeing $r_a(k·T)$ will experience synchronization discontinuities, and consequently bursts of errors at the instants N·T and $N_a$T, respectively. Since N·T and $N_a$·T in this case occur at different instances, the burst errors, both receiving branches can be combined into a new data stream without excessive errors during the switch instances. In accordance with FIG. 1, the digitized and serial-to-parallel converted third signal 24 contains samples $S_2(k·T)-S_1(k·T)$ that are multiplied by a linearly increasing ramp function k/N in block 28 to obtain $(k/N)·(S_2(k·T)-S_1(k·T))$. Subsequently a multiplication with a weighting factor $-\alpha$ is performed in block 30 to obtain $-\alpha·(k/N)·(S_2(k·T)-S_1(k·T))$ as the fourth signal 34. Combining means shown in form of an adder 40 in FIG. 1 then obtain the sum of the fourth signal 34 and the fifth signal 38, i.e. $S_1(k·T)-\alpha·(k/N)·(S_2(k·T)-S_1(k·T))$ as an output signal $r(k·T)$ processed by the diversity receiver in accordance with FIG. 1. The weighting factor $\alpha$ is preferably controlled such that the receiving channel variations are minimized. In embodiments where $\alpha$=v/d, $\alpha$ can be obtained from a speedometer signal measuring for example the car velocity v. However, in the embodiment of FIG. 1, an adaptive control loop is used to set $\alpha$ to ensure for example that the correlation between $r(t)=\alpha·t·s_1(t)+(1-\alpha·t)·s_2(t)$ and the derivative $[S_2(k·T)-S_1(k·T)]$ is zero. Alternatively the control loop can de-correlate $r(k·T)=S_1(k·T)-\alpha·(k/N)·(S_2(k·T)-S_1(k·T))$ and $(k/N)·[S_2(k·T)-S_1(k·T)]$. The decorrelator 32 shown in FIG. 1 computes the correlation between its two inputs defined as correlation=$\Sigma_{k=1 \ldots N}$input$_1$(k·T)·input$_2$(k·T) and computes a value a from the correlation values. Preferably, in an integrating loop, $\alpha$ is the accumulation of the correlation values that have been computed during the last few symbol periods. Output signal r(t) contains at least reduced distortions like ICI compared to the first signal $S1(t)$.

Figure 2:
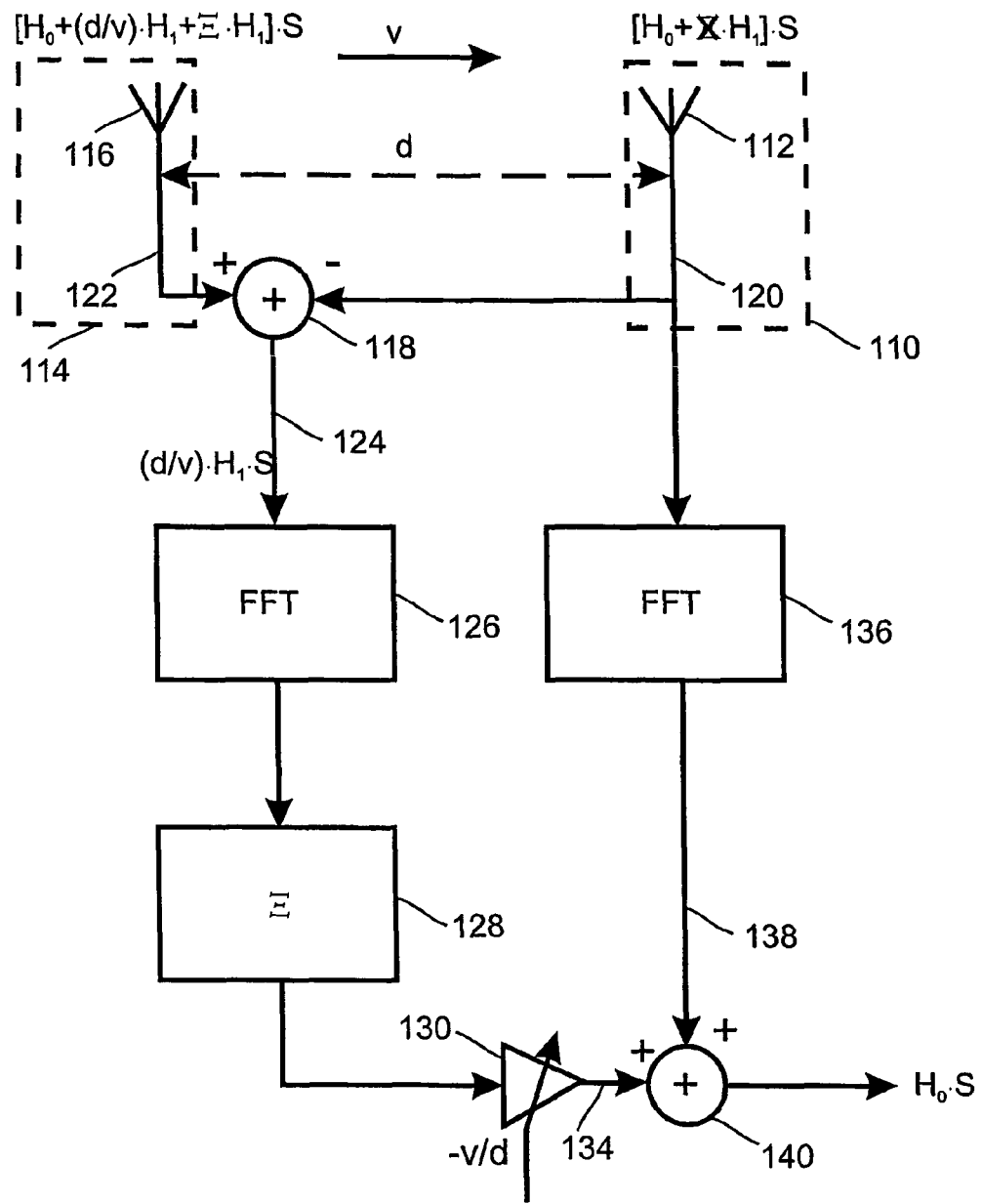
FIG. 2 shows a simplified schematic block diagram of a first embodiment of a diversity receiver in accordance with the present invention.

FIG. 2 shows a simplified schematic block diagram of a second embodiment of the diversity receiver in accordance with the present invention, wherein the second embodiment executes a transition in the frequency domain. Radio signals are received by a first antenna element 112 associated to a first receiving branch 110 and a second antenna element 116 associated to a second receiving branch 114. A third signal 124 is obtained as the difference of a second signal 122 on the second receiving branch 114 and a first signal 120 on the first receiving branch 110 by first means in form of an adder/subtracter 118. Although not shown in FIG. 2, the signals are fed to RF front ends, filtered, sampled into digital samples and converted serial-to-parallel by suitable equipment known in the art that at least in part is referred to as the second means in the language of the present invention. For example as part of an OFDM receiver structure, a Fast Fourier Transformation (FFT) is carried out in blocks 126 (part of the second means) and 136 (part of the third means), respectively. It is known in the art that the effect of ICI can accurately be described as a fixed crosstalk matrix Ξ. With the diversity receiver shown in FIG. 2 both signal branches are processed according to the usual OFDM receiver design. In the signal branch processing the third signal 124, at block 128 (part of the second means) a matrix operation Ξ is executed. The resulting signal is subjected to weighting by a factor $\alpha=-v/d$ at block 130 (part of the second means) to create a fourth signal 134. Examples of methods to derive α have been presented in embodiment of FIG. 1. Fourth means in form of an adder 140 combine the fourth signal 134 and the fifth signal 138 output from block 136 to obtain an output signal $H_0 S$.

FIG. 3 shows a flowchart illustrating an embodiment of the method in accordance with the present invention (steps S1 through S6), and also an embodiment of the method (steps S2 through S6) that may be carried out with the computer program in accordance with the present invention.

Both methods are intended for canceling or at least reducing signal distortions of a radio signal received by a moving diversity receiver, and both methods may for example be used in connection with the diversity receivers discussed above. In step S1 a first signal $S_1(t)$ is obtained via a front antenna and a second signal $S_2(t)$ is obtained via a back antenna. The front antenna may for example be considered to be the main antenna receiving the main signal component. The back antenna follows the same spatial path as the front antenna, but with a slight time lag. In step S2 via $S_3(t)=S_2(t)-S_1(t)$ a third signal $S_3(t)$ is obtained which is interpreted as a temporal derivative and exploited by the following steps to cancel or at least reduce distortions, for example caused by ICI. In Step S3 the first signal $S_1(t)$ and the third signal $S_3(t)$ are sampled, digitized at a rate T, and serial-to-parallel converted for a number of samples N to obtain first samples $S_1(k \cdot T)$ and second samples $S_2(k \cdot T)$. In step S4 the samples $[S_2(k \cdot T) \cdot S_1(k \cdot T)]$ are multiplied by a (linearly increasing) ramp function k/N to obtain $(k/N) \cdot [S_2(k \cdot T) - S_1(k \cdot T)]$. In step S5 a weighting factor α is computed as an accumulation of the following correlation values $\Sigma_{k=1 \ldots N} \{S_1(k \cdot t) - \alpha \cdot (k/N) \cdot [S_2(k \cdot T) - (S_1(kT)]\} \cdot \{(k/N) \cdot [S_2(k \cdot T) - S_1(k \cdot T))\}$ computed during the last few symbol periods. This weighting factor α thereby is controlled to minimize distortions when in step S6 the following output signals are obtained: $r(k \cdot T) = S_1(k \cdot t) - \alpha \cdot (k/N) \cdot [S_2(k \cdot T) - (S_1(k \cdot T)]$ and $r(t) = \alpha \cdot t \cdot S_1(t) + (1 - \alpha \cdot t) \cdot S_2(t)$, respectively.

FIG. 4 shows a simplified schematic block diagram of an antenna arrangement in accordance with the present invention as well as the use of switching means for creating a virtual antenna. The antenna system shown in FIG. 4 comprises a first antenna element 12 and a second antenna element 16. The first antenna element 12 and the second antenna element 16 are closely spaced by a distance d and arranged behind each other in the direction of motion v. The first antenna element 12 and the second antenna element 16 are arranged in parallel but extend, relative to a common basis, in opposite directions. This results in a small mutual interaction of the radiation patterns. In FIG. 4 there are further illustrated switching means 42 for linearly, smoothly switching from a signal $S_1(t)$ on a first receiving branch 10 to a signal $S_2(t)$ on a second receiving branch 14. In good approximation this creates a virtual third antenna element located somewhere in between the first antenna element 12 and the second antenna element 16. By appropriately choosing the rate of the transition, the position of the virtual antenna element can be fixed in space, despite the motion of the two antenna elements.

With the invention described above it is possible to efficiently cancel or at least reduce signal distortions, for example due to ICI, by interpreting a spatial derivative as a temporal derivative and exploiting this temporal derivative. Thereby it is for example possible to receive high rate radio signals (for example video signals having for example a rate of 5 Mbits/sec) with a receiver moving at a high speed (for example a receiver located in a car).

All means mentioned in the description and the claims may be realized, depending on the special embodiment, by components known in the art. In this connection discrete components and/or hardware interacting with software may form one or more of the mentioned means in part or as a whole. Furthermore, any reference signs contained in the claims shall not be constructed as limiting the scope.

The invention claimed is:

1. A diversity receiver for receiving a desired content carried by a radio signal on a radio channel, said diversity receiver comprising:
    a first receiving branch having associated thereto a first antenna element for receiving a first signal;
    at least a second receiving branch having associated thereto a second antenna element for receiving a second signal;
    first means for obtaining, from the first signal on the first receiving branch and the second signal on the second receiving branch, a third signal representing an estimation of a spatial derivative of at least one receiving channel parameter;
    second means for processing the third signal to obtain a, fourth signal;
    third means for processing the first signal, as received by the first receiving branch, to obtain a fifth signal; and
    fourth means for combining the fourth signal and the fifth signal to obtain an output signal, said output signal corresponding to the desired content of the radio signal,
    wherein the third signal is used to cancel or at least reduce signal distortions that occur due to time-variations of the receiving channel,
    and wherein the first antenna element and the second antenna element are closely spaced and arranged behind each other in a direction of motion of the diversity receiver.

2. The diversity receiver according to claim 1, wherein the first means obtains the third signal as a difference between the first signal and the second signal.

3. The diversity receiver according to claim 1, wherein the third signal is interpreted as a temporal derivative of the at least one receiving channel parameter, at least when the diversity receiver is moved.

4. The diversity receiver according to claim 1, wherein one or more of the first means, the second means, the third means, and the fourth means are fully or in part realized by hardware interacting with software or by discrete components.

5. The diversity receiver according to claim 1, wherein the second means perform one or more of the following functions: filtering, sampling, A/D-conversion, serial-to-parallel conversion, multiplying with a ramp function, Fourier Transforming, multiplying with a crosstalk matrix, and signal weighting.

6. The diversity receiver according to claim 1, wherein the second means perform a signal weighting function comprising a multiplication with a weighting factor (·; d/v) controlled to minimize the signal distortions.

7. The diversity receiver according to claim 1, wherein the third means perform one or more of the following functions: filtering, sampling, A/D-conversion, serial-to-parallel conversion, and Fourier Transforming.

8. The diversity receiver according to claim 1, wherein the at least one receiving channel parameter is a receiving channel transfer function.

9. The diversity receiver according to claim 1, wherein said diversity receiver further comprises switching means for switching from a signal on the first receiving branch to a corresponding signal on the second receiving branch thereby creating a virtual third antenna element.

10. The diversity receiver according to claim 1, wherein the first antenna element and the second antenna element are arranged in parallel but extend in different directions.

11. The diversity receiver according to claim 1, wherein the diversity receiver is adapted to be used in one or more of the following systems: Orthogonal Frequency Division Multiplexing systems, Digital Audio Broadcasting systems, Digital Video Broadband systems, for example, DVB-T systems, Digital Terrestrial Television Broadcasting systems, Code Division Multiple Access systems, for example, cellular CDMA systems, Universal Mobile Telecommunications Systems, the Global System for Mobile communications, Digital Enhanced Cordless Telecommunication systems, wireless local area network systems, for example, according to the standard 802.11a, 802.11g, or HIPERLAN II.

12. A method for canceling or at least reducing signal distortions of a desired content carried by a radio signal received by a moving diversity receiver, wherein the signal distortions occur due to time-variations of a receiving channel in a radio system, said method comprising the acts of:
receiving a first signal on a first receiving branch having associated thereto a first antenna element;
receiving a second signal on a second receiving branch having associated thereto a second antenna element;
obtaining, from the first signal and from the second signal, a third signal representing an estimation of a spatial derivative of at least one receiving channel parameter;
processing the third signal to obtain a fourth signal;
processing the first signal, as received, to obtain a fifth signal; and
combining the fourth signal and the fifth signal to obtain an output signal corresponding to the desired content of the radio signal,
wherein the first antenna element and the second antenna element are closely spaced in position and arranged behind each other in a direction of motion of the diversity receiver,
and wherein the act of estimating the spatial derivative comprises calculating a difference between the radio signal received at a first position of said two closely spaced positions and the radio signal received at a second position of said two closely spaced positions.

13. A non-transitory computer readable medium embodying a computer program, comprising instructions for causing a processor, when loaded with said computer program, to cancel or at least reduce signal distortions of a desired content carried by a radio signal received by a moving diversity receiver, the instructions causing the processor to:
receive a first signal on a first receiving branch having associated thereto a first antenna element;
receive a second signal on a second receiving branch having associated thereto a second antenna element;
obtain, from the first signal and from the second signal, a third signal representing an estimation of a spatial derivative of at least one receiving channel parameter;
process the third signal to obtain a fourth signal;
process the first signal, as received, to obtain a fifth signal; and
combine the fourth signal and the fifth signal to obtain an output signal corresponding to the desired content of the radio signal,
wherein the first antenna element and the second antenna element are closely spaced in position and arranged behind each other in a direction of motion of the diversity receiver,
and wherein the act of obtaining a third signal representing an estimation of the spatial derivative comprises calculating a difference between the radio signal received at a first position of said two closely spaced positions and the radio signal received at a second position of said two closely spaced positions.

14. A diversity receiver for receiving a desired content carried by a radio signal on a radio channel, said diversity receiver comprising:
a first antenna configured to receive a first signal on a receiving channel;
a second antenna configured to receive a second signal on the receiving channel;
a first combiner configured to form a third signal from the first signal and the second signal;
a first processing unit configured to process the third signal to obtain a fourth signal;
a second processing unit configured to process the first signal, as received, to obtain a fifth signal; and
a second combiner configured to combine the fourth signal and the fifth signal to obtain an output signal corresponding to the desired content of the radio signal;
wherein the third signal represents an estimation of a spatial derivative of at least one receiving channel parameter,
wherein the third signal is used to reduce signal distortions that occur due to time-variations of the receiving channel,
and wherein the first antenna and the second antenna are closely spaced in position and arranged behind each other in a direction of motion of the diversity receiver,
and wherein the first combiner is configured to form the third signal from the first signal and a difference signal, the difference signal being a difference between the first signal and the second signal.

15. The diversity receiver as claimed in claim 14, wherein said diversity receiver further comprises a weighting unit configured to multiply the difference signal with a factor that depends on at least one a speed of the diversity receiver and a distance between the first antenna and the second antenna.

16. The diversity receiver as claimed in claim 14, wherein said diversity receiver further comprises a decorrelator configured to decorrelate the difference signal and the third signal and compute a weighting factor for weighting the difference signal.

17. The diversity receiver as claimed in claim 14, wherein said diversity receiver further comprises a multiplier configured to multiply the difference signal with a linearly increasing ramp function.

* * * * *